United States Patent
Dakroub

[19]

[11] Patent Number: 5,995,313
[45] Date of Patent: Nov. 30, 1999

[54] THERMAL ASPERITY SUPPRESSION USING HIGH SPEED SHORTING AND BASELINE COMPENSATION

[75] Inventor: Housan Dakroub, Oklahoma City, Okla.

[73] Assignee: Seagate Technology, Inc., Scotts Valley, Calif.

[21] Appl. No.: 08/921,406

[22] Filed: Aug. 29, 1997

Related U.S. Application Data

[60] Provisional application No. 60/035,862, Jan. 21, 1997.

[51] Int. Cl.$^6$ .................................................. G11B 5/02
[52] U.S. Cl. ................... 360/67; 360/25; 360/55; 327/317; 327/551; 327/310
[58] Field of Search ................... 360/67, 75, 55, 360/25; 361/110, 111; 327/58, 179, 310, 317, 551; 455/126

[56] References Cited

U.S. PATENT DOCUMENTS

| | | | |
|---|---|---|---|
| 4,698,721 | 10/1987 | Warren | 361/110 |
| 5,070,538 | 12/1991 | Milberger et al. | 455/126 |
| 5,262,907 | 11/1993 | Duffy et al. | |
| 5,422,760 | 6/1995 | Abbott et al. | |
| 5,715,110 | 2/1998 | Nishiyama et al. | 360/67 |
| 5,818,656 | 10/1998 | Klaassen et al. | 360/67 |
| 5,831,456 | 11/1998 | Sutardja | 327/100 |
| 5,847,890 | 12/1998 | Hattori | 360/51 |
| 5,856,983 | 1/1999 | Okazaki | 371/21.4 |
| 5,898,532 | 4/1999 | Du et al. | 360/46 |

*Primary Examiner*—Aristotelis M. Psitos
*Assistant Examiner*—Dan I. Davidson
*Attorney, Agent, or Firm*—Crowe & Dunlevy

[57] ABSTRACT

An apparatus and method for suppressing the effects of thermal asperities in readback signals of a hard disc drive are disclosed. A suppression circuit is provided having a clamping path that establishes an electrical short between a readback signal path transmitting the readback signal and a reference line for the readback signal in order to remove substantially all of the energy associated with the thermal asperity from the readback signal. The suppression circuit further includes a compensation path operably coupled between the readback signal path and the reference line to subsequently provide baseline compensation for the readback signal by introducing a non-zero impedance between the readback signal path and the reference line.

14 Claims, 2 Drawing Sheets

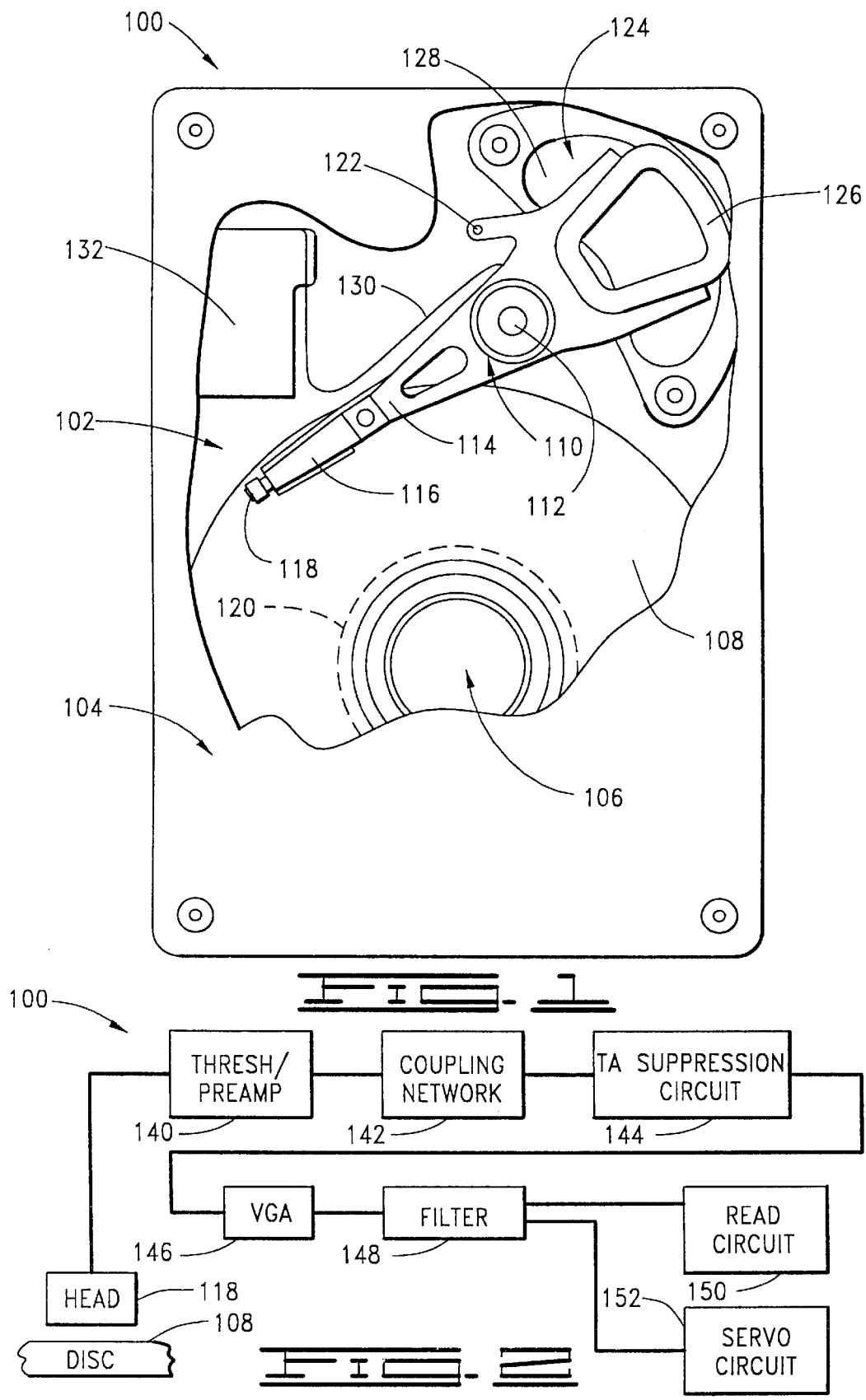

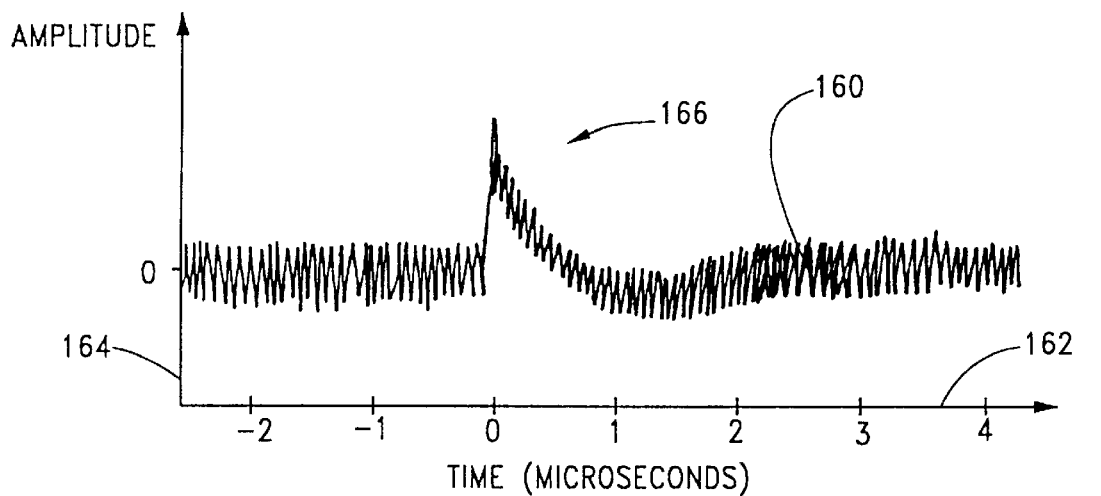
FIG. 3
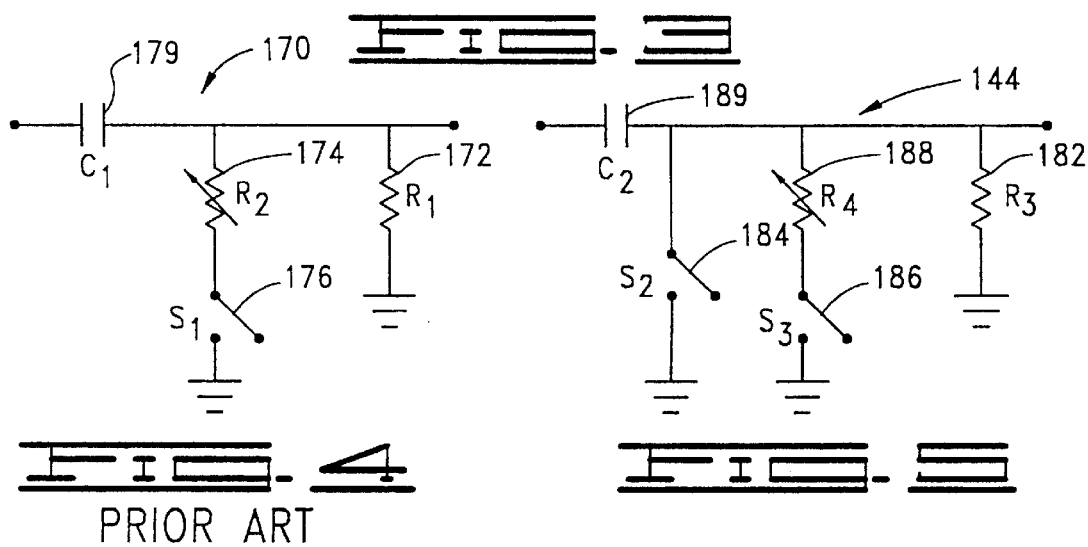
FIG. 4
PRIOR ART
FIG. 5
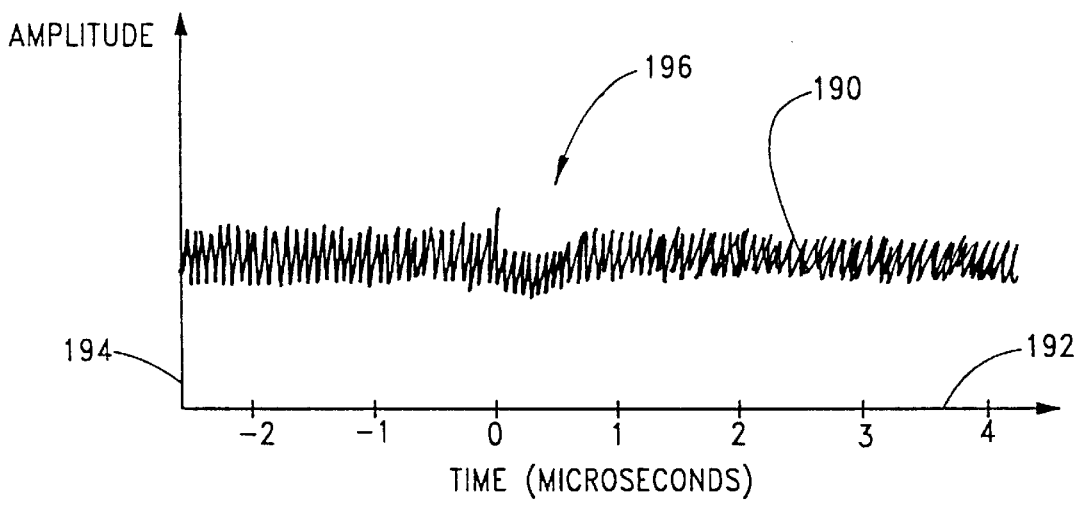
FIG. 6

THERMAL ASPERITY SUPPRESSION USING HIGH SPEED SHORTING AND BASELINE COMPENSATION

CROSS-REFERENCE TO RELATED APPLICATIONS

This application claims priority to U.S. Provisional Application Ser. No. 60/035,862 filed Jan. 21, 1997.

FIELD OF THE INVENTION

The present invention relates generally to the field of data storage devices and more particularly, but without limitation, to the suppression of thermal asperities in disc drive readback signals through the use of high speed clamping.

BACKGROUND

Data storage devices of the type known as "Winchester" or "hard" disc drives are typically provided with a plurality of rigid discs that are coated with a magnetizable medium and mounted on the hub of a spindle motor for rotation at a constant high speed. A controllably positionable actuator is disposed adjacent the discs, the actuator including a plurality of heads which are used during write and read operations to magnetically store and retrieve user data from tracks defined on the disc surfaces.

A closed loop servo system is used to control the position of the heads with respect to the tracks on the disc. More particularly, the actuator typically includes a coil of a voice coil motor (VCM) so that currents applied to the coil by the servo system cause the heads to move relative to the tracks in a controlled manner. A read/write channel, responsive to the heads, cooperates with an interface circuit to control the transfer of user data between the discs and a host computer in which the disc drive is mounted.

As will be recognized, consumer demand for disc drives with ever increasing data storage capacities and transfer rates has led to continual advances in the disc drive art. One such advancement is the use of magneto-resistive (MR) heads, each of which typically includes an MR element having a changed electrical resistance in the presence of a magnetic field of a particular orientation. Thus, during a disc drive read operation a bias current is passed through the MR element and the data stored on the corresponding track are detected as a function of changes in voltage across the MR element.

Another advancement in the disc drive art facilitating greater data storage capacities has been the continued reduction in the flying heights of the heads above the recording media. However, bringing the heads in closer proximity to the discs increases the sensitivity of the disc drive to the effects of anomalous conditions caused by defects associated with the media, especially with the use of MR heads. Particularly, irregularities on the surface of the discs can be large enough to physically contact the MR element of the heads as the discs rotate under the heads. Such contact, while of very short time duration, results in frictional heating of the MR element. The change of temperature brought about by the contact correspondingly produces a change in the resistance of the MR element. Such events are known as thermal asperities, or TAs, and can significantly distort the readback signal generated by the head. A TA event is typically characterized by a sudden increase in read signal amplitude, followed by a relatively long falling edge due to the heat dissipation time constant of the MR head.

Small "hills" and "valleys" in the disc surfaces can also induce TA events even without physical contact occurring between the MR element and the disc surface. Because the bias current applied to the MR element results in heating of the MR element, a thermal equilibrium is established in which the generated heat in the MR element is continually dissipated from the MR element through other elements of the head assembly and, to a lesser extent, across the air bearing supporting the head above the disc. Thus, disc surface variations that change the spacing between the MR element and the disc can induce attendant changes in the heat dissipation characteristics of the head, resulting in localized distortion in the readback signal obtained from the head.

TAs found in disc drives using currently available media are of a size which can span a significant number of bytes; for example, in a disc drive having a data transfer rate of 200 megabits per second (Mbits/sec), uncompensated thermal asperities can last from 1 to 5 microseconds, distorting from about 25 to 125 bytes of data. Further, it will be recognized that TAs can grow over time due to factors such as contamination and corrosion of the disc surfaces, which can significantly degrade the capabilities of a disc drive to reliably store and retrieve user data over the operational life of the drive.

Compensation for the effects of thermal asperities is typically provided through the use of error detection and correction circuitry of the read/write channel, provided that the number of affected bytes is within the correction capability of the circuitry. Efforts have also been made in the prior art to filter the read signal upon the occurrence of a TA to reduce the time constant of the falling edge of the TA in order to reduce the number of bytes affected by the TA.

However, limitations have been encountered with such prior art approaches. Firstly, the selective introduction of additional filtering in response to TAs typically increases a disc drive read error rate, due to the corresponding movement of poles within read circuitry of the read/write channel. Secondly, the filtering is typically provided for a predetermined length of time, so that error rates are also increased for bytes immediately following the TA and not otherwise affected by the TA.

Thirdly, such filtering is usually programmable to compensate for various factors, including the characteristics of each detected TA as well as to compensate for variations in data transfer rates across the radii of the discs. Such programmability increases the complexity of the read circuit and the associated overhead for devices controlling the operation of the read circuit. Finally, such filtering ultimately limits the maximum data transfer rate of a disc drive, in that greater numbers of bytes are affected by a TA as the transfer rate increases, whereas the number of erroneous bytes that can be corrected by the error detection and correction circuitry generally remains constant in successive generations of drives. Hence, there is a maximum transfer rate beyond which the number of bytes affected by a TA event will exceed the error correction capability of the read circuit, even with the selective use of filtering to minimize the number of erroneous bytes.

Accordingly, there is a need for an improved, simplified approach to compensating for the effects of thermal asperities that can significantly reduce the number of affected bytes in a read signal and can accommodate ever increasing disc drive transfer rates.

SUMMARY OF THE INVENTION

The present invention provides an apparatus and method for suppressing the effects of thermal asperities and other anomalous conditions in readback signals of a data storage device, such as a disc drive.

In accordance with the preferred embodiment, a suppression circuit is provided having a clamping path that establishes an electrical short between a readback signal path transmitting the readback signal and a reference line for the readback signal in order to remove substantially all of the energy associated with the thermal asperity from the readback signal.

The suppression circuit further includes a compensation path operably coupled between the readback signal path and the reference line to subsequently provide baseline level compensation for the readback signal.

In the preferred embodiment, the clamping path includes a normally open switch that is closed for about 10–20 nanoseconds to clamp the readback signal. Moreover, the compensation path preferably comprises a resistor in series with a second normally open switch that is closed for about 300–500 nanoseconds, during which time the resistor introduces an impedance between the readback signal path and the reference line in order to minimize baseline shift in the readback signal.

These and various other features as well as advantages which characterize the present invention will be apparent from a reading of the following detailed description and a review of the associated drawings.

BRIEF DESCRIPTION OF THE DRAWINGS

FIG. 1 shows a top plan view of a disc drive constructed in accordance with the preferred embodiment of the present invention.

FIG. 2 provides a functional block diagram of a portion of the disc drive of FIG. 1, including a thermal asperity suppression circuit constructed in accordance with the preferred embodiment.

FIG. 3 provides a graphical representation of a readback signal in response to the occurrence of a thermal asperity.

FIG. 4 provides a schematic diagram illustrating a filtering circuit of the prior art employed to reduce the effects of a thermal asperity such as illustrated by FIG. 3.

FIG. 5 provides a schematic diagram of the thermal asperity suppression circuit of FIG. 2.

FIG. 6 provides a graphical representation of a readback signal with the use of the thermal asperity suppression circuit of FIG. 5.

DETAILED DESCRIPTION

Turning now to the drawings and more particularly to FIG. 1, shown therein is a top plan view of a disc drive 100 constructed in accordance with the preferred embodiment of the present invention. The disc drive 100 includes a base deck 102 to which various disc drive components are mounted and a top cover 104, which is shown in a partial cut-away fashion to expose selected components of interest. The base deck 102 cooperates with the top cover 104 to provide an internal, sealed environment for the disc drive 100 in a conventional manner.

Mounted to the base deck 102 is a spindle motor (shown generally at 106) to which a plurality of discs 108 are mounted for rotation at a constant high speed. Adjacent the discs 108 is an actuator assembly 110 which pivots about a cartridge bearing assembly 112 in a rotary fashion. The actuator assembly 110 includes actuator arms 114 which support flexures 116. The flexures 116 in turn support heads 118, with each of the heads 118 corresponding to a surface of one of the discs 108. As provided hereinabove, the heads 118 are positionably located over data tracks (not shown) of the discs 108 in order to read data from and write data to the tracks. At such time that the disc drive 100 is not in use, the heads 118 are moved to landing zones (denoted at broken line 120), which are located in FIG. 1 near the inner diameter of the discs 108. A latching arrangement (a pin of which is shown at 122) is used to secure the actuator assembly 110 when the heads 118 are moved to the landing zones 120.

Continuing with FIG. 1, the actuator assembly 110 is controllably positioned by way of a voice coil motor (VCM, shown generally at 124) comprising an actuator coil 126 immersed in the magnetic field generated by at least one permanent magnet 128. When current is passed through the actuator coil 126, an electromagnetic field is set up therein which interacts with the magnetic circuit of the VCM 124, causing the actuator assembly 110 to pivot about the cartridge bearing assembly 112 and the heads 118 to move across the surfaces of the discs.

To provide the requisite electrical conduction paths between the heads 118 and disc drive read/write circuitry (not shown in FIG. 1), head wires (not separately shown) are routed on the actuator assembly 110 from the heads 118, along the flexures 116 and the actuator arms 114 to a flex circuit assembly 130. Particularly, the head wires are secured to corresponding pads of a flex circuit board 132 which is connected to a flex 134 which terminates at a flex circuit bracket 136. The flex circuit assembly 130 facilitates communication between the actuator assembly 110 and a printed circuit board (PCB) mounted to the underside of the disc drive 100.

FIG. 2 provides a general functional block diagram for portions of the disc drive 100 of FIG. 1 in accordance with the preferred embodiment of the present invention. As shown in FIG. 2, a selected one of the heads 118, which for purposes of illustration is contemplated as being an MR head, generates a readback signal during a read operation upon a selected track (not shown) disposed on the corresponding disc 108. Although a single path is provided between the various components shown in FIG. 2 (using a reference to ground), a differential circuit utilizing multiple paths could readily be implemented.

The readback signal from the head 118 is provided to a threshold detector and preamp circuit 140 (hereinafter also referred to as "preamp") which provides preamplification and frequency domain filtering of the signal provided by the head 118. Of particular interest is the capability of the preamp 140 to sense excursions of the nominal amplitude of the readback signal above a predetermined threshold, which is useful in detecting the occurrence of a thermal asperity.

The output signal from the preamp 140 is provided to a coupling network 142, which provides capacitive coupling for the circuit in a conventional manner. The output of the coupling network 142 is in turn provided to a thermal asperity (TA) suppression circuit 144 (hereinafter also referred to as "TA circuit"), the construction and operation of which will be discussed in greater detail below. Generally, however, the TA circuit 144 operates to suppress the effects of a thermal asperity upon the readback signal in order to enhance the operational performance of the disc drive 100.

The output of the TA circuit 144 is provided to a variable gain amplifier (VGA) 146, which includes an automatic gain control (AGC) stage to maintain a nominal signal amplitude for the remainder of the circuitry of FIG. 2. The AGC operates to set a gain in response to the input signal level from the TA circuit 144.

The output signal from the VGA 146 is then prefiltered by an adaptive filter network 148 which generally operates as a low pass filter to remove higher frequency noise components from the signal. The filter network 148 further selectively provides the filtered readback signal to a read circuit 150 and a servo circuit 152, depending upon whether the readback signal is generated from a user data field or a servo field. As will be recognized, the read circuit 150 operates to reconstruct user data from the user data fields and the servo circuit 152 operates to maintain the head 118 in a desired relation to the surface of the disc. The construction operation of the read circuit 150 and the servo circuit 152 are conventional and hence, beyond the scope of the present disclosure. For reference, additional discussion concerning typical read and servo circuits is provided in U.S. Pat. No. 5,422,760, issued Jun. 6, 1995 to Abbott et al. and U.S. Pat. No. 5,262,907 issued Nov. 16, 1993 to Duffy et al., respectively.

Although the preferred embodiment as set forth by FIG. 2 shows the use of a single TA circuit 144, VGA 146 and filter network 148 for both the read circuit 150 and the servo circuit 152, it will be readily understood that other configurations are contemplated, such as separate TA circuits, VGAs and filters for the read and servo circuits, which can be advantageously employed depending upon the requirements of a particular application.

To illustrate the effects of a typical TA event, FIG. 3 has been provided which shows a readback signal 160, plotted against an x-axis 162 indicative of elapsed time (in microseconds) and a y-axis 164 indicative of relative amplitude of the readback signal. For reference, the readback signal 160 is contemplated as being measured at the output of the coupling network 142 of FIG. 2 during the reading of a selected user data field (not shown) on the disc 108.

A thermal asperity (TA) is identified at 166 and is characterized by a sudden increase in amplitude at time t=0 followed by a decaying portion that extends out for about two microseconds (t=2). The portion of the readback signal 160 corresponding to the thermal asperity 166 will generally be sufficiently distorted to prevent proper decoding by the read circuit 150.

Particularly, the VGA 146 will attempt to compensate for a TA event by decreasing the gain of the AGC, which will adversely affect the ability of the read circuit 150 and the servo circuit 152 to properly decode the readback signal. Moreover, both the read circuit 150 and the servo circuit 152 rely on portions of the readback signal at or near the nominal signal baseline for both training and decoding purposes. Accordingly, a TA event may not only prevent recovery of particular bytes coincident with the TA event, but may also cause the undesired adjustment of parameters which will impede the proper decoding of the remaining portions of the user data or servo field, respectively.

Turning to FIG. 4, shown therein is a schematic diagram for a prior art suppression circuit 170 implemented to reduce the effects of TA events, such as illustrated by FIG. 3. The suppression circuit 170 of FIG. 4 includes a primary resistor 172 with a relatively high resistance $R_1$ connecting the readback signal path to ground. In parallel with the resistor 172 is a programmable resistor 174 with a variable resistance $R_2$ in series with a normally open switch 176 $S_1$, also connected to ground as shown. As will be recognized, the reference line can be a mirrored signal path instead of ground. A decoupling capacitor 179 with capacitance $C_1$ is shown in series at the input of the suppression circuit 170.

During normal operation, the switch $S_1$ (176) remains open, enabling the high resistance $R_1$ to maintain a nominal baseline reference for the readback signal. However, upon the occurrence of a thermal asperity, control circuitry (not separately shown) closes the switch 176, introducing the resistance $R_2$ into the circuit 170 in parallel with the resistance $R_1$.

The variable resistance $R_2$ is selected to be substantially lower than the resistance $R_1$; accordingly, the time constant associated with the decay of the thermal asperity is decreased in an effort to restore the baseline of the readback signal back to a nominal level (i.e., shorten the duration and hence the number of bytes affected by the thermal asperity). The switch is typically instructed to remain closed for a predetermined amount of time (such as 1–2 microseconds), sufficient to accommodate a range of thermal asperity durations. The variable resistance $R_2$ is typically programmed on-the-fly depending on a variety of factors, including the position of the head 118 with respect to the disc 108.

As discussed above, the prior art approach of thermal asperity compensation as illustrated in FIG. 4 is accompanied by several drawbacks, including the fact that the circuit does not substantially alter the shape of the thermal asperity other than to reduce the time constant (and hence, the duration) of the event. Accordingly, substantial baseline excursions are still present which will typically affecting the gain of the AGC and various read and servo parameters. Moreover, the time during which the switch $S_1$ remains closed can be of sufficient length (1–2 microseconds) to cover a significant number of bytes immediately following the thermal asperity, reducing the overall error rate performance of the read circuit (150 of FIG. 2) for these bytes. Further, the variable resistance $R_2$ requires additional circuit complexity to accommodate the selection of programming inputs for each TA event.

The present invention, on the other hand, provides an improved compensation methodology having significant operational advantages over the prior art. Rather than altering the time constant of the read signal to limit the duration of the thermal asperity, in the practice of the present invention the energy of the thermal asperity is substantially removed from the readback signal altogether by quickly shorting the readback signal to a reference line (such as ground). Baseline compensation is then applied to the readback signal to minimize negative baseline shift to maintain the amplitude range of the readback signal near its optimum range.

Referring now to FIG. 5, shown therein is a schematic diagram for the thermal asperity suppression circuit 144 of FIG. 2, constructed in accordance with the preferred embodiment of the present invention. As shown in FIG. 5, the TA circuit 144 includes a primary resistor 182 having a relatively high resistance $R_3$ connected to ground as shown. The TA circuit 144 further includes a primary, normally open switch $S_2$ 184 and a secondary, normally open switch $S_3$ 186 in series with a secondary resistor 188 having a resistance $R_4$. A decoupling capacitor 189 having capacitance $C_2$ is also shown; this capacitor can be part of the TA circuit 144, or part of the coupling network 142 (FIG. 2).

During normal disc drive operation, the switches $S_2$, $S_3$ (184 and 186) remain open, allowing the resistor 182 operate in a manner similar to that of the prior art circuit 170 of FIG. 4. However, when a TA event (such as 166 of FIG. 3) is detected, the switch S2 is closed, clamping the readback signal to ground in order to drain off substantially all of the energy associated with the initial surge of the thermal asperity 166. The time that the switch $S_2$ remains closed will depend upon the characteristics of each disc drive, but will generally be a very short period of time, such as 10–20 nanoseconds. Although control lines are not shown, in the preferred embodiment the filter network 148 (FIG. 2) controls the operation of the switches $S_2$ and $S_3$.

Preferably, the switch $S_3$ is closed at the same time (or immediately after) the switch $S_2$ is closed; however, the initial closing of the switch $S_3$ has little effect upon the operation of the TA circuit 144 as long as the switch $S_2$ remains closed, as substantially all of the energy associated with the initial surge of the thermal asperity 166 will pass through the switch $S_2$ and bypass the switch $S_3$. However, once the switch $S_2$ is been reopened, the switch $S_3$ will come into play, causing the adjustment of the baseline reference for the readback signal through resistances $R_3$, $R_4$. Once the switch $S_3$ is subsequently reopened, the TA circuit 144 will return to its normal state.

The effect of the operation of the TA circuit 144 of FIG. 5 can be seen from a review of FIG. 6, which provides a graphical representation of a readback signal 190 plotted against an x-axis 192 indicative of time (in microseconds) and a y-axis 194 indicative of relative readback signal amplitude. For purposes of clarity, it will be understood that the readback signal 190 of FIG. 6 represents the output response of the TA circuit 144 of FIG. 5 in response to the inputting of the readback signal 160 of FIG. 3 to the TA circuit 144. As discussed below, the TA circuit 144 operates to substantially remove the effects of the thermal asperity 166 from the output readback signal 160 of FIG. 3, as indicated at corresponding compensated portion 196 of the signal 190.

As shown in FIG. 6, the closing of the switch $S_2$ (184 of FIG. 5) at time t=0 operates to remove the initial, steep increase in amplitude of the thermal asperity 166 (FIG. 3) by draining off substantially all of the energy associated with the TA event. Shorting the readback signal at this point causes the signal to have a significantly reduced value and effectively removes all of the information from the signal at this point. Thus, the use of error correction circuitry will generally be required in order to reconstruct the associated data. However, in the preferred embodiment the switch $S_2$ is only closed for 10–20 nanoseconds, which for a data transfer rate of 200 megabits/second will only affect about 3–5 bits (less than a byte) of data in the readback signal, which is clearly within the error correction capability of the read circuit 150.

Once the energy associated with the TA event has been removed, the readback signal will exhibit a certain amount of negative baseline shift which is compensated for by the TA circuit 144. Particularly, when the switch $S_2$ is subsequently reopened, the closing of the switch $S_3$ will cause the TA circuit 144 to apply both the resistance $R_4$ and $R_3$ (188 and 182 of FIG. 5) to the readback signal 190, adjusting the baseline of the readback signal to a value near zero volts, as shown by the compensated portion 196 of FIG. 6. The selected length of time that the switch $S_3$ remains closed is based upon the typical response of each drive; that is, the time will generally correspond to the nominal length of time that the readback signal exhibits negative baseline shifting after the signal is temporarily shorted by the switch $S_2$. However, in the preferred embodiment the switch $S_3$ of FIG. 5 will remain closed for around 300–500 nanoseconds.

From the foregoing discussion it will be recognized that the present invention provides significant advantages over the prior art. First, the characteristic shape of a TA event is completely modified by the TA circuit 144 of FIG. 5, unlike prior art approaches that tend to reduce the duration, but not the amplitude of the portion of the readback signal affected by the TA event. Particularly, it has been found that the operation of the TA circuit 144 will result in a slight reduction in the nominal baseline signal level for about 300–500 nanoseconds in response to an uncompensated TA event of two or more microseconds, enabling the read circuit 150 to decode substantially all of the information associated with the readback signal. Secondly, baseline voltages are maintained at or near the nominal baseline level over the entire duration of the TA event.

Thirdly, although the resistance $R_4$ of the resistor 188 of FIG. 5 could be made variable, there is no requirement and little advantage to do so; rather, a fixed value lower than the resistance $R_3$ of the resistor 182 will accommodate all data transfer rates experienced by the drive as the head 118 is positioned relative to the corresponding disc 108 and will accommodate significant variations in duration and magnitude of TA events. Thus, the TA circuit 144 does not require the use of programmable resistor inputs, unlike many prior art suppression circuits (such as illustrated in FIG. 4). Finally, the prior art requires a compromise in the programming of the variable resistance $R_2$ (FIG. 4) to achieve an acceptable baseline response and duration for the TA event, whereas the TA circuit of FIG. 5 takes a more effective approach by simply removing the energy associated with the TA event and compensating for the resulting negative baseline shift.

It will be readily understood that the switches $S_2$ and $S_3$ (184 and 186) of FIG. 5 can be implemented in a variety of ways, including through the use of discrete devices such as a transistor or multiplexor (mux). Moreover, although the baseline compensation operation of the TA circuit 144 of FIG. 5 has been disclosed as using the discrete resistor 184 with fixed resistance $R_4$, the desired resistance $R_4$ could readily be obtained through the use of other types of devices, such as with a transistor operated in its linear region. Finally, it is contemplated that, in certain applications, a single transistor might be utilized, the transistor being provided with an input control profile that causes the transistor to initially conduct at a substantially zero impedance, followed by a period of time of operation in its linear region to perform the requisite baseline compensation. These and other modifications comprise insubstantial changes to the invention as disclosed herein and are accordingly within the spirit and scope of the invention as claimed below.

Accordingly, in view of the foregoing discussion it will be recognized that the present invention provides an improved apparatus and method for suppressing the effects of thermal asperities in disc drive readback signals. In accordance with the disclosed embodiment, a head (such as 118) of a disc drive (such as 100) generates a readback signal (such as 160) as a disc (such as 108) is read.

At such time that a thermal asperity (such as 166) is detected in the readback signal, a suppression circuit (such as 144) operably connects the readback signal to a reference line (such as ground) in order to remove substantially all of the energy associated with the thermal asperity from the readback signal. The suppression circuit then provides baseline compensation by connecting a non-zero impedance (such as resistor 188) between the readback signal and the reference line.

For purposes of the appended claims, it will be understood that the phrase "reference line" comprises a path that provides a voltage reference for the readback signal, such as electrical ground or a mirrored path in a multi-path, differential circuit. Moreover, the phrase "anomalous condition"

will be understood to comprise an event that causes a sudden, localized change in the baseline value of a readback signal, such as a thermal asperity. The phrase nonzero impedance will be understood to be an impedance having some value other than zero, and can be generated by way of a resistor or similar device. Finally, the term "circuit" will be broadly understood to include both hardware and firmware based implementations.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims. Moreover, although the present invention has been described for use in a hard disc drive, the present invention can readily be used in other types of data storage devices that experience similar anomalous conditions as described herein.

What is claimed is:

1. A method for suppressing the effects of an anomalous condition in a readback signal of a data storage device, the anomalous condition characterized as comprising a localized, substantial increase in baseline signal level in the readback signal, the method comprising the steps:

(a) establishing a first electrical connection between a signal path transmitting the readback signal and a reference line for the readback signal to remove substantially all of the energy associated with the anomalous condition from the readback signal, the first electrical connection having substantially zero impedance; and (b) establishing a second electrical connection between the signal path and the reference line to minimize baseline shifting of the readback signal, the second electrical connection having an impedance greater than the impedance of the first electrical connection.

2. The method of claim 1, wherein the first electrical connection is established over a first period of time and the second electrical connection is established over a second period of time following the first period of time.

3. The method of claim 2, wherein the first period of time has a duration of about 10–20 nanoseconds and the second period of time has a duration of about 300–500 nanoseconds.

4. The method of claim 1, wherein the first electrical connection is characterized as comprising:

a normally open switch that is closed to establish an electrical short between the signal path and the reference line.

5. The method of claim 1, wherein the second electrical connection is characterized as comprising:

a resistor having a fixed value of resistance; and a normally open switch connected in series with the resistor, the normally open switch closed to establish the second electrical connection, wherein the impedance of the second electrical connection is substantially established by the fixed value of resistance of the resistor.

6. The method of claim 1, wherein the signal path transmitting the readback signal includes a serially connected capacitor.

7. The method of claim 1, wherein the data storage device comprises a hard disc drive.

8. The method of claim 7, wherein the anomalous condition comprises a thermal asperity induced by interaction between a head and a disc of the disc drive.

9. An apparatus for compensating for the effects of an anomalous condition in a readback signal of a data storage device, the anomalous condition characterized as comprising a localized, substantial increase in baseline signal level in the readback signal, the apparatus comprising:

a first electrical connection path operably connected between a readback signal path over which the readback signal is transmitted and a reference line for the readback signal, the first electrical connection path comprising:

a first switch that, when closed, creates an electrical short between the readback signal path and the reference line to remove substantially all of the energy associated with the anomalous condition from the readback signal; and a second electrical connection path operably connected between the readback signal path and the reference line, the second electrical connection path comprising:

a second switch that, when closed, places an impedance between the readback signal path and the reference line sufficient to minimize baseline shifting of the readback signal.

10. The apparatus of claim 9, wherein the data storage device comprises a hard disc drive.

11. The apparatus of claim 10, wherein the anomalous condition comprises a thermal asperity induced by interaction between a head and a disc of the disc drive.

12. The apparatus of claim 9, further comprising a capacitor connected in series with the readback signal path.

13. A disc drive, comprising:

a head disposed adjacent a rotatable, selectively magnetized disc, the head generating a readback signal from the magnetization of the disc;

a preamplifier operably coupled to the head, the preamplifier amplifying and outputting the readback signal on a readback signal path; and a suppression circuit operably coupled to the preamplifier circuit, the suppression circuit minimizing the effects of a thermal asperity in the readback signal, the suppression circuit comprising:

a clamping path operably coupled between the readback signal path and a reference line for the readback signal, wherein the clamping path is electrically nonconductive during nominal operation of the disc drive and electrically conductive upon detection of the thermal asperity for a first period of time during which the clamping path establishes an electrical short to remove substantially all of the energy associated with the thermal asperity from the readback signal; and a compensation path operably coupled between the readback signal path and the reference line, wherein the compensation path is electrically nonconductive during nominal operation of the disc drive and electrically conductive for a second period of time following the first period of time, during which the compensation path has a non-zero impedance to minimize baseline shifting of the readback signal.

14. The disc drive of claim 13, wherein the compensation path comprises:

a normally open switch; and a resistor connected in series with the switch, the resistor having a resistance substantially that of the non-zero impedance of the compensation path.

* * * * *